US012771020B2

(12) United States Patent
Wu et al.

(10) Patent No.: US 12,771,020 B2
(45) Date of Patent: Oct. 20, 2026

(54) ULTRA-WIDEBAND ANTENNA DEVICE

(71) Applicant: ASUSTeK COMPUTER INC., Taipei (TW)

(72) Inventors: Yu-Ching Wu, Taipei (TW); Chien-Ming Hsu, Taipei (TW)

(73) Assignee: ASUSTEK COMPUTER INC., Taipei City (TW)

( * ) Notice: Subject to any disclaimer, the term of this patent is extended or adjusted under 35 U.S.C. 154(b) by 563 days.

(21) Appl. No.: 18/191,214

(22) Filed: Mar. 28, 2023

(65) Prior Publication Data

US 2024/0072432 A1 Feb. 29, 2024

(30) Foreign Application Priority Data

Aug. 26, 2022 (TW) ................................. 111132378

(51) Int. Cl.
*H01Q 3/24* (2006.01)
*H01Q 5/25* (2015.01)

(52) U.S. Cl.
CPC ................. *H01Q 3/24* (2013.01); *H01Q 5/25* (2015.01)

(58) Field of Classification Search
CPC ............. H01Q 3/24; H01Q 5/25; H01Q 1/243
See application file for complete search history.

(56) References Cited

U.S. PATENT DOCUMENTS

| | | | | |
|---|---|---|---|---|
| 10,741,906 B2 * | 8/2020 | Gomez Angulo | ....... | H01Q 5/42 |
| 2020/0321988 A1 * | 10/2020 | Kim | ........................ | H04M 1/02 |
| 2022/0085488 A1 | 3/2022 | Irci et al. | | |
| 2024/0396206 A1 * | 11/2024 | Wang | .................. | G01S 13/0209 |

FOREIGN PATENT DOCUMENTS

| | | |
|---|---|---|
| CN | 110225194 A | 9/2019 |
| CN | 110768681 A | 2/2020 |
| CN | 112437399 A | 3/2021 |
| CN | 113093161 A | 7/2021 |
| CN | 113225671 A | 8/2021 |
| CN | 113394059 A | 9/2021 |
| CN | 114171899 A | 3/2022 |
| CN | 114188707 A | 3/2022 |

* cited by examiner

*Primary Examiner* — Dimary S Lopez Cruz
*Assistant Examiner* — Austin M Back
(74) *Attorney, Agent, or Firm* — McClure, Qualey & Rodack, LLP

(57) ABSTRACT

An ultra-wideband antenna device is disposed on a casing of an electronic device. The ultra-wideband antenna device includes radio frequency terminals, a first antenna module, a second antenna module, and a switch module. The radio frequency terminals, the first antenna module and the switch module are located in the casing. The first antenna module is located on a metal frame of the casing, and the first antenna module includes a first antenna. The second antenna module includes a second antenna, a third antenna, and a fourth antenna. The switch module is connected between the radio frequency terminals and the first antenna module. When the switch module turns on one of the radio frequency terminals and the first antenna for distance measurement, the switch module selectively turns on at least one of the second antenna, the third antenna, or the fourth antenna.

11 Claims, 14 Drawing Sheets

ULTRA-WIDEBAND ANTENNA DEVICE

CROSS-REFERENCE TO RELATED APPLICATION

This application claims the priority benefit of Taiwan Application Serial No. 111132378, filed on Aug. 26, 2022. The entirety of the above-mentioned patent application is hereby incorporated by reference herein and made a part of the specification.

BACKGROUND OF THE INVENTION

Field of the Invention

The disclosure relates to an ultra-wideband (UWB) antenna device for selectively switching radiation patterns.

Description of the Related Art

An antenna is required when an electronic device transmits or receives a radio frequency signal. The antenna is configured to not only transmit the radio frequency signal, but also implement a positioning function. In the related art, the electronic device adopts an ultra-wideband (UWB) positioning technology to implement indoor positioning. For an ultra-wideband antenna, because a transmission distance of the ultra-wideband antenna is generally within 10 meters, a bandwidth of over 1 GHz is used. In addition, ultra wideband belongs to a carrier-free communication technology, data is transmitted using non-sinusoidal narrow pulses at a nanosecond (ns) to picosecond (ps) level, and these pulses occupy a wide bandwidth range.

However, with the development of communication technologies, the electronic device needs to support more types of radio frequency signals, such as 4G, 5G, and WiFi. As a result, a large quantity of antennas need to be disposed inside the electronic device, which leads to a smaller space in the electronic device. The space is insufficient to dispose an ultra-bandwidth antenna for positioning. Therefore, on a small-sized electronic device, compressing the size of the ultra-bandwidth antenna has a great impact on the transmission performance of the ultra-bandwidth antenna, which adversely affects signal receiving and transmission of the antenna.

BRIEF SUMMARY OF THE INVENTION

According to the first aspect of this disclosure, an ultra-wideband antenna device is provided. The ultra-wideband antenna device is disposed on a casing of an electronic device. The ultra-wideband antenna device includes a plurality of radio frequency terminals, a first antenna module, a second antenna module, and a switch module. The radio frequency terminals are located in the casing. The first antenna module is located on a metal frame of the casing, and the first antenna module includes a first antenna. The second antenna module is located in the casing, and the second antenna module includes a second antenna, a third antenna, and a fourth antenna. The switch module is located in the casing and connected between the radio frequency terminals and the first antenna module and between the radio frequency terminals and the second antenna module, and when the switch module turns on one of the radio frequency terminals and the first antenna for distance measurement, the switch module selectively turns on at least one of the second antenna, the third antenna, or the fourth antenna.

According to the second aspect of this disclosure, r an ultra-wideband antenna device is provided. The ultra-wideband antenna device is disposed on a casing of an electronic device. The ultra-wideband antenna device includes a plurality of radio frequency terminals, a first antenna module, a second antenna module, and a switch module. The radio frequency terminals are located in the casing. The first antenna module is located on a metal frame of the casing, and the first antenna module includes a first antenna and a second antenna. The second antenna module is located in the casing, and the second antenna module includes a third antenna and a fourth antenna. The switch module is located in the casing and connected between the radio frequency terminals and the first antenna module and between the radio frequency terminals and the second antenna module, and when the switch module turns on one of the radio frequency terminals and one of the first antenna or the second antenna for distance measurement, the switch module selectively turns on the remaining second antenna or first antenna, and at least one of the third antenna or the fourth antenna.

Based on the above, the disclosure provides an ultra-wideband antenna device that selectively switches a distance measurement antenna or a positioning antenna using the switch module without increasing the antenna size and the space, to increase pattern coverage in distance measurement or positioning. Therefore, the ultra-wideband antenna device of the disclosure has good pattern coverage and directivity in a limited space, to effectively increase the antenna efficacy and maintain good wireless communication quality.

BRIEF DESCRIPTION OF THE DRAWINGS

FIG. 7 is a distribution diagram of an antenna radiation pattern when an ultra-wideband antenna device of the disclosure operates in a 6.325 GHz frequency band and the first antenna is turned on.

FIG. 8 is a distribution diagram of an antenna radiation pattern when an ultra-wideband antenna device of the disclosure operates in a 7.78 GHz frequency band and the first antenna is turned on.

FIG. 9 is a distribution diagram of an antenna radiation pattern when an ultra-wideband antenna device of the disclosure operates in a 6.325 GHz frequency band and the first antenna and the second antenna are turned on.

FIG. 10 is a distribution diagram of an antenna radiation pattern when an ultra-wideband antenna device of the disclosure operates in a 7.78 GHz frequency band and the first antenna and the second antenna are turned on.

FIG. 11 is a distribution diagram of an antenna radiation pattern when an ultra-wideband antenna device of the disclosure operates in a 6.325 GHz frequency band and the first antenna and the third antenna are turned on.

FIG. 12 is a distribution diagram of an antenna radiation pattern when an ultra-wideband antenna device of the disclosure operates in a 7.78 GHz frequency band and the first antenna and the third antenna are turned on.

FIG. 13 is a distribution diagram of an antenna radiation pattern when an ultra-wideband antenna device of the disclosure operates in a 6.325 GHz frequency band and the first antenna, the second antenna, and the third antenna are turned on.

FIG. 14 is a distribution diagram of an antenna radiation pattern when an ultra-wideband antenna device of the disclosure operates in a 7.78 GHz frequency band and the first antenna, the second antenna, and the third antenna are turned on.

DETAILED DESCRIPTION OF THE EMBODIMENTS

Figure 1:
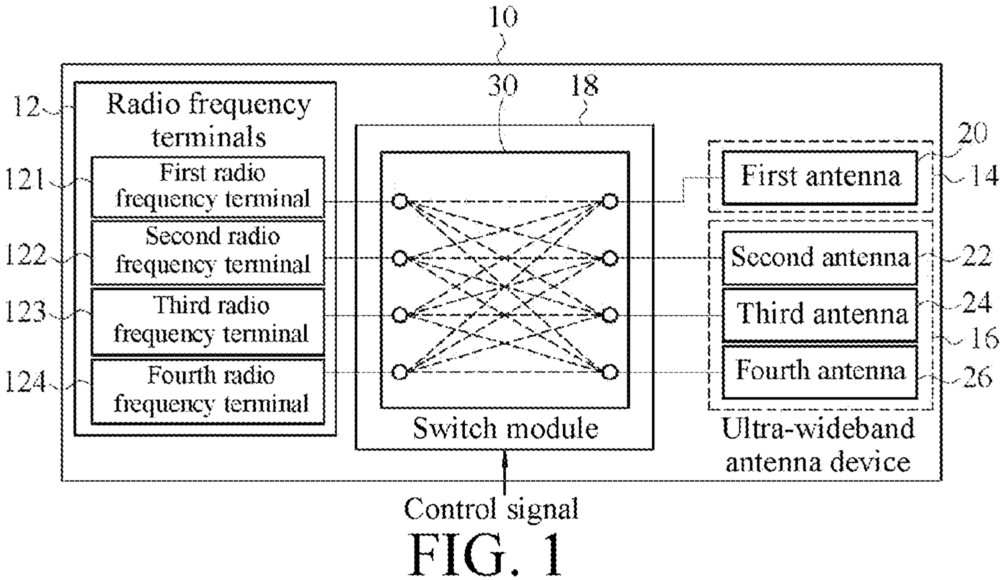
FIG. 1 is a schematic block diagram of an ultra-wideband antenna device according to an embodiment of the disclosure.

Embodiments of the disclosure are described with reference to relevant drawings. In addition, some components or structures are omitted in the drawings in the embodiments, to clearly show technical features of the disclosure. In these drawings, the same reference numerals represent the same or similar components or circuits. It is to be understood that although the terms “first”, “second” and the like in the specification are used for describing various components, parts, regions, or functions, these components, parts, regions, and/or functions are not limited by these terms. These terms are merely used for distinguishing one component, part, region, or function from another component, part, region, or function.

Figure 2:
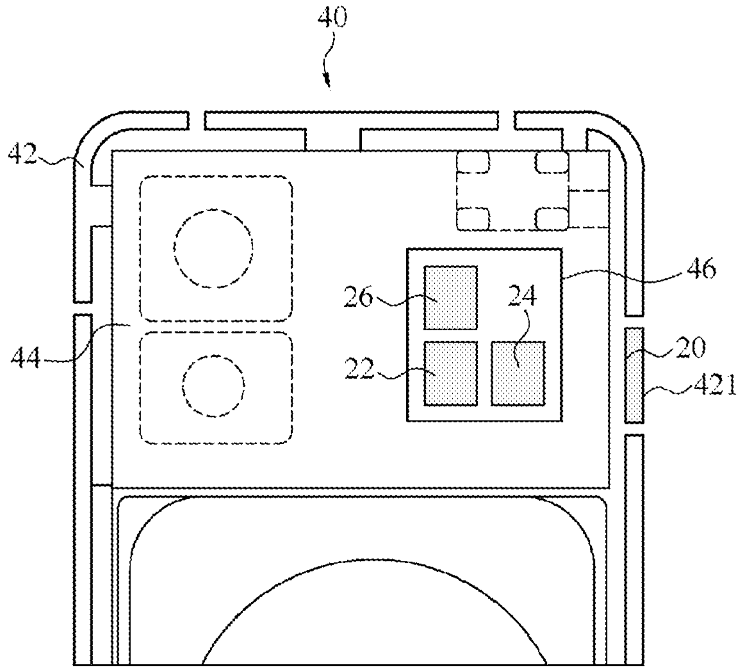
FIG. 2 is a schematic structural diagram of an antenna configuration of an ultra-wideband antenna device according to an embodiment of the disclosure.

Referring to FIG. 1 and FIG. 2 together, an ultra-wideband antenna device 10 is disposed on a casing 42 of an electronic device 40, and a printed circuit board (PCB) 44 is disposed in the casing 42. Components of the electronic device 40 are mounted on the PCB 44. The ultra-wideband antenna device 10 includes a plurality of radio frequency terminals 12, a first antenna module 14, a second antenna module 16, and a switch module 18. In the ultra-wideband antenna device 10, the plurality of radio frequency terminals 12 is located in the casing 42, and the first antenna module 14 is located on a metal frame 421 of the casing 42 and includes a first antenna 20. In this embodiment, the metal frame 421 located on a right side of the casing 42 directly serves as the first antenna 20. The second antenna module 16 is located in the casing 42 and includes a second antenna 22, a third antenna 24, and a fourth antenna 26. In this embodiment, the second antenna 22, the third antenna 24, and the fourth antenna 26 are disposed on a carrier board 46 and are arranged in an L shape, and the carrier board 46 is disposed on the PCB 44. The switch module 18 is also located in the casing 42 and connected between the radio frequency terminals 12 and the first antenna module 14 and between the radio frequency terminals 12 and the second antenna module 16, so that the switch module 18 selectively connects the radio frequency terminals 12 to the first antenna module 14 and the second antenna module 16 for transmission. When the switch module 18 turns on one of the radio frequency terminals 12 and the first antenna 20 for distance measurement, the switch module 18 selectively turns on at least one of the second antenna 22, the third antenna 24, or the fourth antenna 26 for positioning.

In an embodiment, a quantity of the radio frequency terminals 12 is the same as a total quantity of antennas of the first antenna module 14 and the second antenna module 16. Therefore, four radio frequency terminals 12 are provided, which are a first radio frequency terminal 121, a second radio frequency terminal 122, a third radio frequency terminal 123, and a fourth radio frequency terminal 124, to respectively turn on radio frequency signal transmission between the first radio frequency terminal 121, the second radio frequency terminal 122, the third radio frequency terminal 123, and the fourth radio frequency terminal 124, and the first antenna 20, the second antenna 22, the third antenna 24, and the fourth antenna 26 through the switch module 18.

As shown in FIG. 1 and FIG. 2, when the switch module 18 turns on the first antenna 20 for distance measurement, the switch module 18 selectively turns on one of the second antenna 22, the third antenna 24, or the fourth antenna 26, selectively turns on two of the first antenna 22, the third antenna 24, or the fourth antenna 26, or simultaneously turns on the first antenna 22, the third antenna 24, and the fourth antenna 26, to increase pattern coverage through the switching and matching by the switch module 18. In an embodiment, the disclosure uses an example in which the second antenna 22, the third antenna 24, and the fourth antenna 26 are simultaneously turned on. The first radio frequency terminal 121 is electrically connected to the corresponding first antenna 20 through turn-on by the switch module 18, to use the first antenna 20 as a distance measurement antenna. In this case, the second radio frequency terminal 122 is electrically connected to the corresponding second antenna 22 through turn-on by the switch module 18, the third radio frequency terminal 123 is electrically connected to the corresponding third antenna 24 through turn-on by the switch module 18, and the fourth radio frequency terminal 124 is electrically connected to the corresponding fourth antenna 26 through turn-on by the switch module 18, to use the second antenna 22, the third antenna 24, and the fourth antenna 26 as positioning antennas. In another embodiment, the fourth radio frequency terminal 124 is also electrically connected to the corresponding first antenna 20 through turn-on by the switch module 18, to use the first antenna 20 as a distance measurement antenna. In this case, the first radio frequency terminal 121 is electrically connected to the corresponding second antenna 22 through turn-on by the switch module 18, the second radio frequency terminal 122 is electrically connected to the corresponding third antenna 24 through turn-on by the switch module 18, and the third radio frequency terminal 123 is electrically connected to the corresponding fourth antenna 26 through turn-on by the switch module 18, to use the second antenna 22, the third antenna 24, and the fourth antenna 26 as positioning antennas. One-to-one relative connection relationships between the radio frequency terminals 12 (the first radio frequency terminal 121, the second radio frequency terminal 122, the third radio frequency terminal 123, and the fourth radio frequency terminal 124) and the first antenna 20, the second antenna 22, the third antenna 24, and the fourth antenna 26 are adjusted randomly (as required) through the switch module 18.

In an embodiment, as shown in FIG. 1, the switch module 18 uses a four pole four throw (4P4T) switch 30. Therefore, through the switching of the 4P4T switch 30, the first radio frequency terminal 121, the second radio frequency terminal 122, the third radio frequency terminal 123, or the fourth radio frequency terminal 124 is randomly turned on and electrically connected to the first antenna 20, the second antenna 22, the third antenna 24, or the fourth antenna 26. The disclosure also uses other xPxT switches or any combination of xPxT switches.

In an embodiment, the electronic device 40 is a mobile phone, a personal digital assistant, a tablet computer, a notebook computer, or the like. Any portable electronic device with a mobile communication function is covered in the disclosure.

Figure 3:
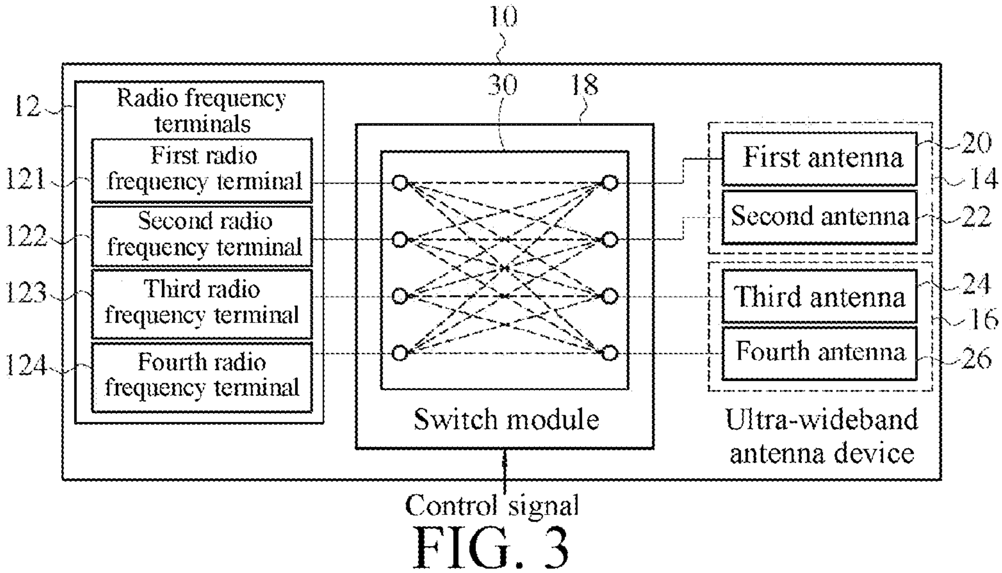
FIG. 3 is a schematic block diagram of an ultra-wideband antenna device according to another embodiment of the disclosure.
Figure 4:
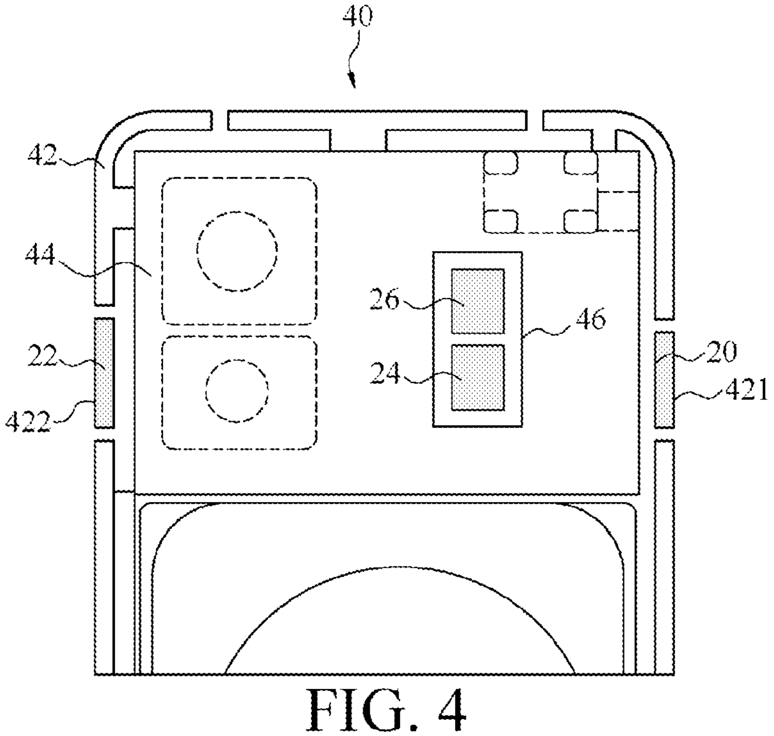
FIG. 4 is a schematic structural diagram of an antenna configuration of an ultra-wideband antenna device according to another embodiment of the disclosure.

Referring to FIG. 3 and FIG. 4 together, an ultra-wideband antenna device 10 is disposed on a casing 42 of an electronic device 40, and a PCB 44 is disposed in the casing 42. The ultra-wideband antenna device 10 includes a plurality of radio frequency terminals 12, a first antenna module 14, a second antenna module 16, and a switch module 18. In the ultra-wideband antenna device 10, the plurality of radio frequency terminals 12 is located in the casing 42. A quantity of the radio frequency terminals 12 is the same as a total quantity of antennas of the first antenna module 14 and the second antenna module 16. Therefore, four radio frequency terminals 12 are provided in this embodiment, which are a first radio frequency terminal 121, a second radio frequency terminal 122, a third radio frequency terminal 123, and a fourth radio frequency terminal 124. The first antenna module 14 is located on a metal frame 421 or 422 of the casing 42, and includes a first antenna 20 and a second antenna 22. The metal frame 421 or 422 is further breakable through at least one breakpoint to respectively serve as the first antenna 20 and the second antenna 22. In this embodiment, the metal frame 421 located on a right side of the casing 42 directly serves as the first antenna 20, and the metal frame 422 located on a left side of the casing 42 serves as the second antenna 22. The second antenna module 16 is located in the casing 42 and includes a third antenna 24 and a fourth antenna 26. In this embodiment, the third antenna 24 and the fourth antenna 26 are disposed on a carrier board 46, and the carrier board 46 is disposed on the PCB 44. The switch module 18 is located in the casing 42 and connected between the radio frequency terminals 12 and the first antenna module 14 and between the radio frequency terminals 12 and the second antenna module 16, so that the switch module 18 selectively turns on transmission between the radio frequency terminals 12 and the first antenna module 14 and the second antenna module 16. When the switch module 18 turns on one of the radio frequency terminals 12 and one of the first antenna 20 or the second antenna 22 for distance measurement, the switch module 18 selectively turns on the remaining second antenna 22 or first antenna 20, and at least one of the third antenna 24 or the fourth antenna 26.

As shown in FIG. 3 and FIG. 4, when the switch module 18 turns on the first antenna 20 for distance measurement, the switch module 18 selectively turns on one of the second antenna 22, the third antenna 24, or the fourth antenna 26, selectively turns on two of the second antenna 22, the third antenna 24, or the fourth antenna 26, or simultaneously turns on the second antenna 22, the third antenna 24, and the fourth antenna 26, to serve as positioning antennas. Similarly, when the switch module 18 turns on the second antenna 22 for distance measurement, the switch module 18 selectively turns on one of the first antenna 20, the third antenna 24, or the fourth antenna 26, selectively turns on two of the first antenna 20, the third antenna 24, or the fourth antenna 26, or simultaneously turns on the first antenna 20, the third antenna 24, and the fourth antenna 26, to serve as positioning antennas. Therefore, the disclosure increases pattern coverage through the switching and matching by the switch module 18.

Figure 5:
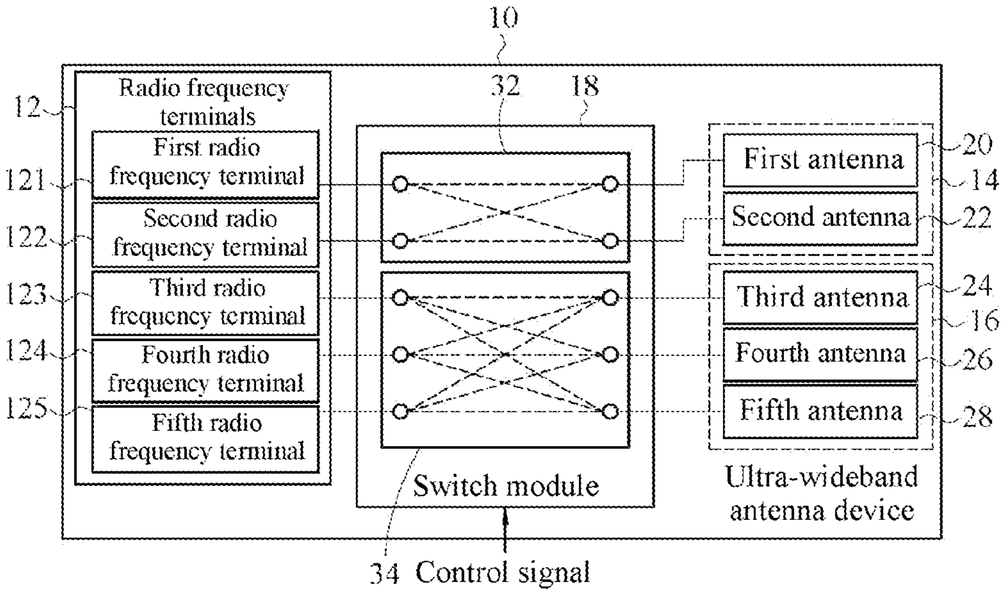
FIG. 5 is a schematic block diagram of an ultra-wideband antenna device according to still another embodiment of the disclosure.
Figure 6:
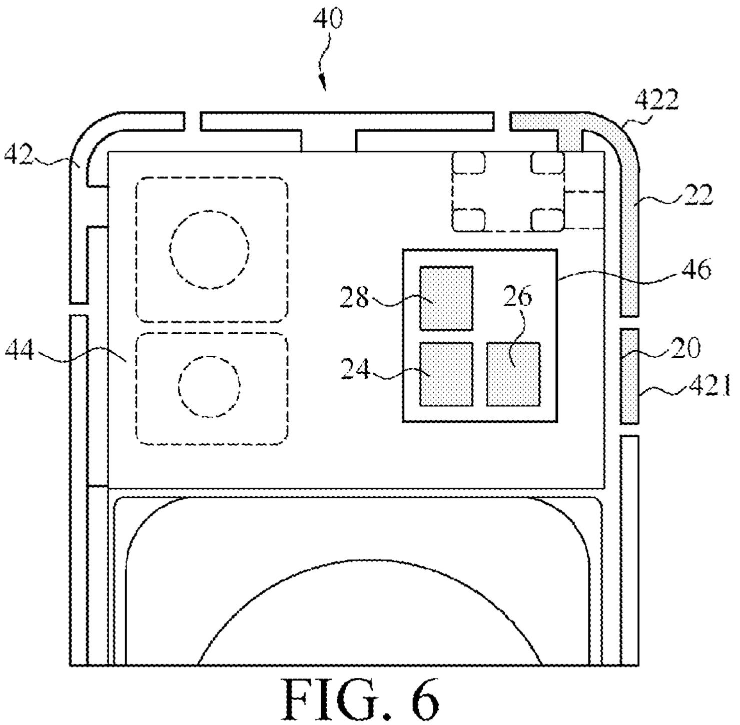
FIG. 6 is a schematic structural diagram of an antenna configuration of an ultra-wideband antenna device according to still another embodiment of the disclosure.

Referring to FIG. 5 and FIG. 6 together, an ultra-wideband antenna device 10 is disposed on a casing 42 of an electronic device 40, and a PCB 44 is disposed in the casing 42. The ultra-wideband antenna device 10 includes a plurality of radio frequency terminals 12, a first antenna module 14, a second antenna module 16, and a switch module 18. In the ultra-wideband antenna device 10, the plurality of radio frequency terminals 12 is located in the casing 42. The first antenna module 14 is located on a metal frame 421 or 422 of the casing 42, and includes a first antenna 20 and a second antenna 22. The metal frame 421 or 422 is further breakable through at least one breakpoint to respectively serve as the first antenna 20 and the second antenna 22. In this embodiment, the metal frame 421 located on a right side of the casing 42 directly serves as the first antenna 20, and the metal frame 422 located at an upper right corner of the casing 42 serves as the second antenna 22. The second antenna module 16 is located in the casing 42 and includes a third antenna 24, a fourth antenna 26, and a fifth antenna 28. In this embodiment, the third antenna 24, the fourth antenna 26, and the fifth antenna 28 are disposed on a carrier board 46 and are arranged in an L shape, and the carrier board 46 is disposed on the PCB 44. The switch module 18 is located in the casing 42 and connected between the radio frequency terminals 12 and the first antenna module 14 and between the radio frequency terminals 12 and the second antenna module 16, so that the switch module 18 selectively turns on transmission between the radio frequency terminals 12 and the first antenna module 14 and the second antenna module 16. When the switch module 18 turns on one of the radio frequency terminals 12 and one of the first antenna 20 or the second antenna 22, the switch module 18 selectively turns on the remaining second antenna 22 or first antenna 20, and at least one of the third antenna 24, the fourth antenna 26, or the fifth antenna 28 for positioning.

In an embodiment, a quantity of the radio frequency terminals 12 is the same as a total quantity of antennas of the first antenna module 14 and the second antenna module 16. Therefore, five radio frequency terminals 12 are provided, which are a first radio frequency terminal 121, a second radio frequency terminal 122, a third radio frequency terminal 123, a fourth radio frequency terminal 124, and a fifth radio frequency terminal 125, to respectively turn on radio frequency signal transmission between the first radio frequency terminal 121, the second radio frequency terminal 122, the third radio frequency terminal 123, the fourth radio frequency terminal 124, and the fifth radio frequency terminal 125, and the first antenna 20, the second antenna 22, the third antenna 24, the fourth antenna 26, and the fifth antenna 28 through the switch module 18.

As shown in FIG. 5 and FIG. 6, in the ultra-wideband antenna device 10, when the switch module 18 turns on the first antenna 20 for distance measurement, the second antenna 22 is selectively turned on or not. If selectively turned on, the second antenna 22 is configured to assist the first antenna 20 to improve the directivity of the antenna. In this case, the switch module 18 selectively turns on one of the third antenna 24, the fourth antenna 26, or the fifth antenna 28, selectively turns on two of the third antenna 24, the fourth antenna 26, or the fifth antenna 28, or simultaneously turns on the third antenna 24, the fourth antenna 26, and the fifth antenna 28, to serve as positioning antennas. Similarly, when the switch module 18 selectively turns on the second antenna 22 for distance measurement, the first antenna 20 is selectively turned on or not. If selectively turned on, the first antenna 20 is configured to assist the second antenna 22 to improve the directivity of the antenna.

In this case, the switch module 18 selectively turns on one of the third antenna 24, the fourth antenna 26, or the fifth antenna 28, selectively turns on two of the third antenna 24, the fourth antenna 26, or the fifth antenna 28, or simultaneously turns on the third antenna 24, the fourth antenna 26, and the fifth antenna 28, to serve as positioning antennas. Based on this, the disclosure increases pattern coverage through the switching and matching by the switch module 18.

In an embodiment, as shown in FIG. 5, the switch module 18 uses a two pole two throw (2P2T) switch 32 to match a three pole three throw (3P3T) switch 34. Therefore, through the matching and switching of the 2P2T switch 32 and the 3P3T switch 34, the first radio frequency terminal 121, the second radio frequency terminal 122, the third radio frequency terminal 123, the fourth radio frequency terminal 124, or the fifth radio frequency terminal 125 is randomly turned on and electrically connected to the first antenna 20, the second antenna 22, the third antenna 24, or the fourth antenna 26, or the fifth antenna 28. The disclosure also uses other xPxT switches or any combination of xPxT switches.

As shown in FIG. 1, FIG. 3, and FIG. 5, the switch module 18 controls the switching of the switches using an algorithm of software. The disclosure uses a modem to generate a control signal to the switch module 18, to use the control signal to control an action (ON or OFF) of the switch module 18.

The disclosure respectively simulates antenna radiation patterns using the ultra-wideband antenna device 10 shown in FIG. 1 and FIG. 2.

Figure 7:
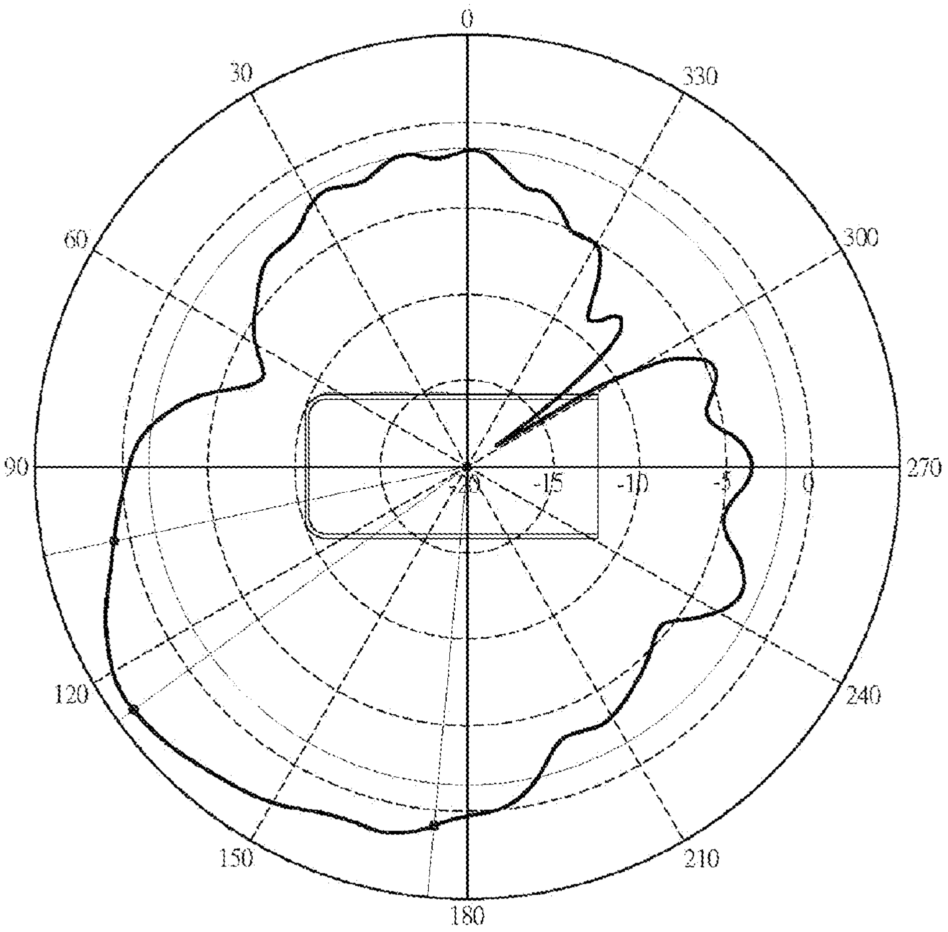
Figure 8:
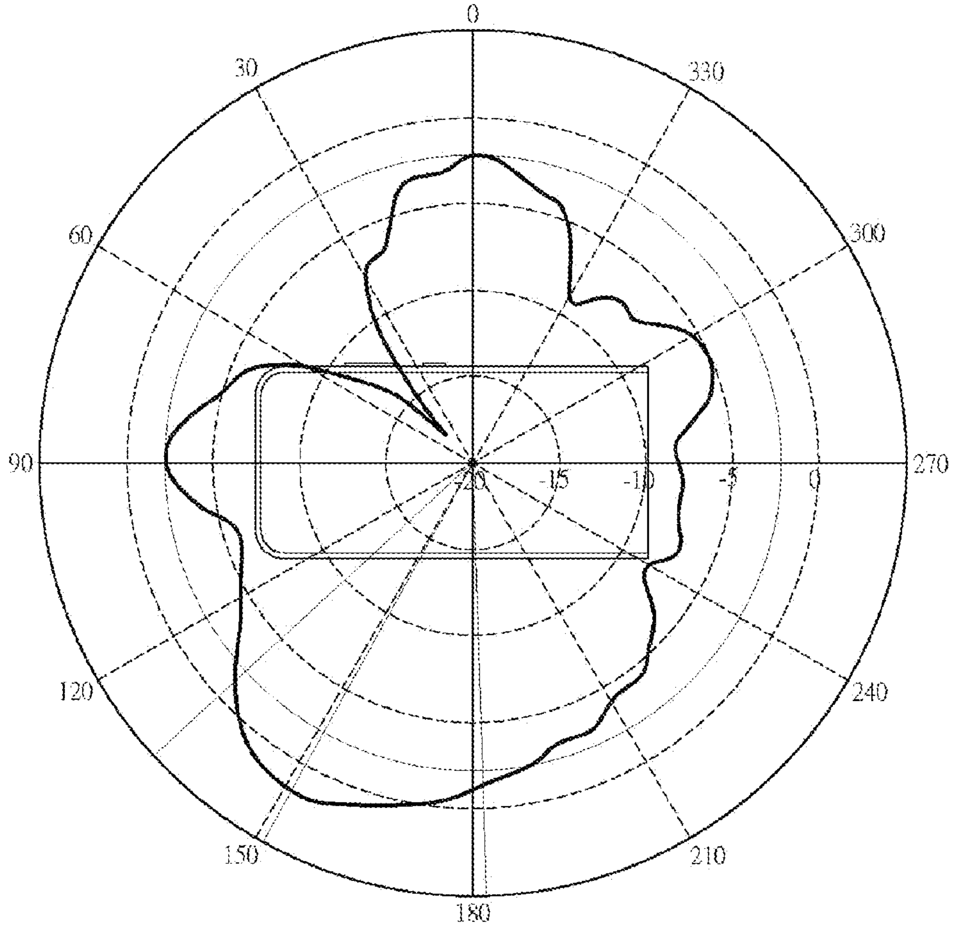

When the ultra-wideband antenna device 10 operates in a 6.325 GHz operation frequency band, and only the first antenna 20 is turned on, an antenna radiation pattern of the ultra-wideband antenna device 10 is shown in FIG. 7. It is learnt from a curve shown in the drawing that a main lobe magnitude is 3.89 dBi, a main lobe direction is 126 degrees, an angular width (3 dB) is 72.9 degrees, and a side lobe level is −5.5 dB. When the ultra-wideband antenna device 10 operates in a 7.78 GHz operation frequency band, and only the first antenna 20 is turned on, an antenna radiation pattern of the ultra-wideband antenna device 10 is shown in FIG. 8. It is learnt from a curve shown in the drawing that the main lobe magnitude is 1.87 dBi, the main lobe direction is 151 degrees, the angular width (3 dB) is 49 degrees, and the side lobe level is −4.0 dB.

Figure 9:
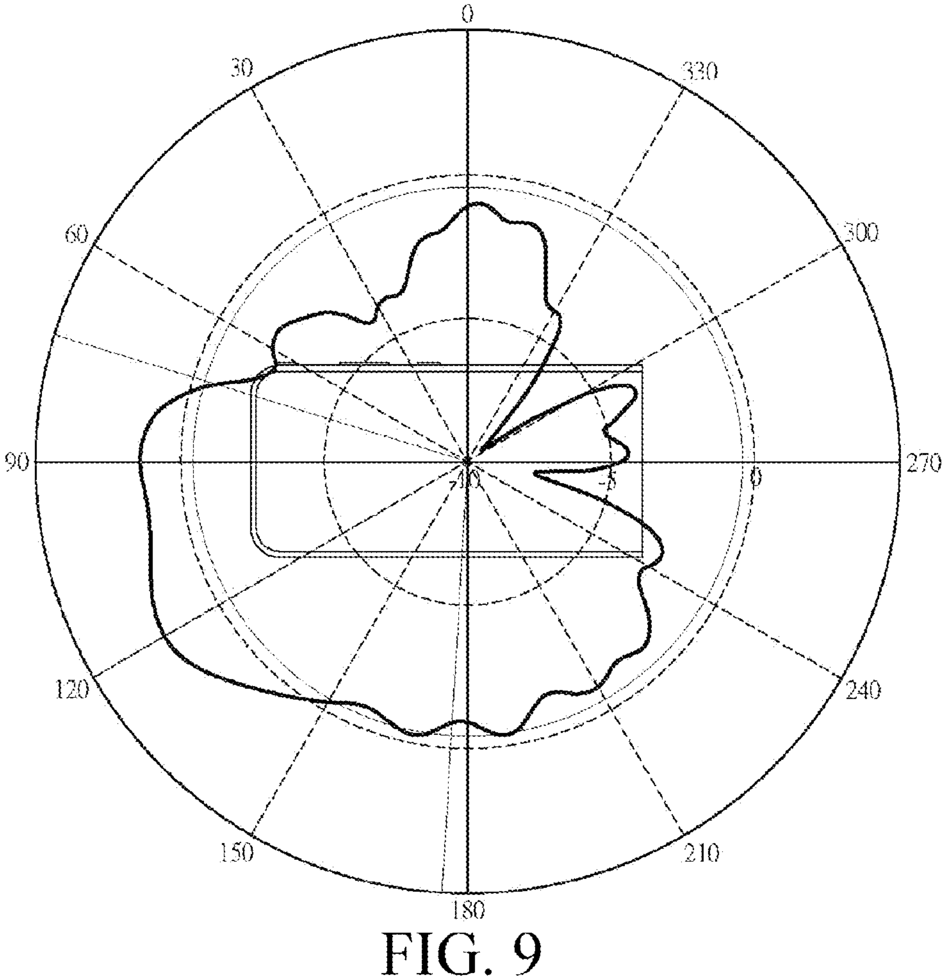
Figure 10:
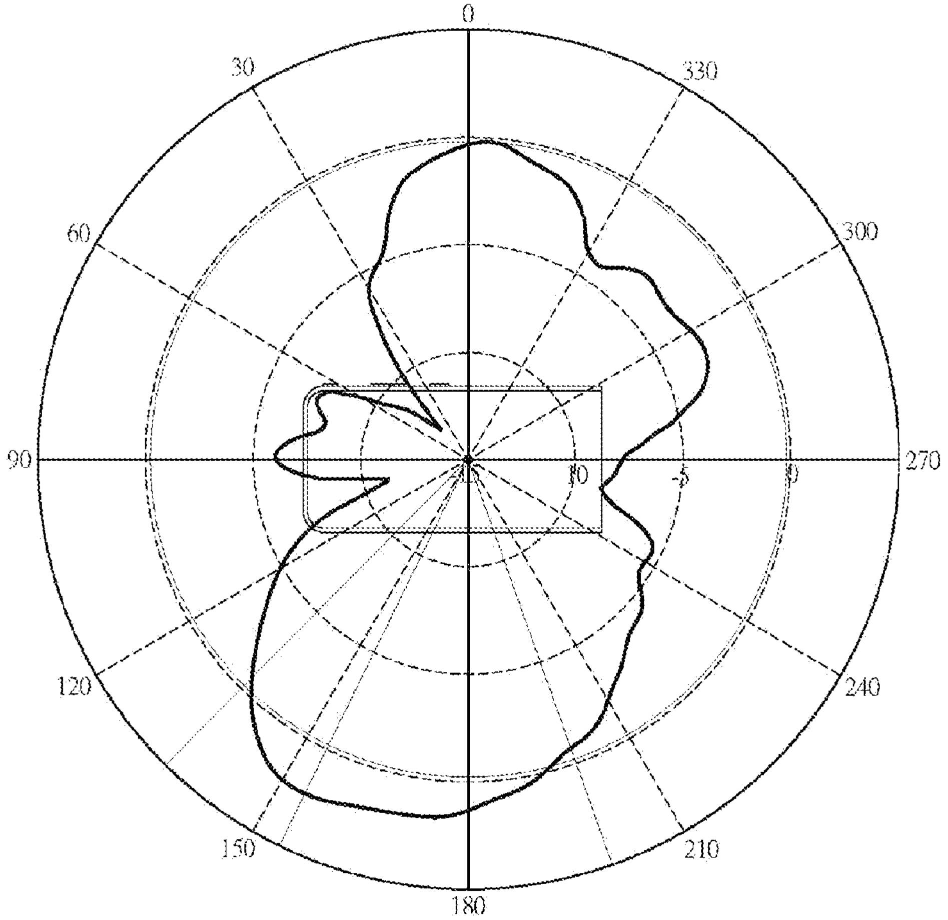

When the ultra-wideband antenna device 10 operates in the 6.325 GHz operation frequency band, and the first antenna 20 and the second antenna 22 are turned on, an antenna radiation pattern of the ultra-wideband antenna device 10 is shown in FIG. 9. It is learnt from a curve shown in the drawing that the main lobe magnitude is 2.12 dBi, the main lobe direction is 120 degrees, the angular width (3 dB) is 103.7 degrees, and the side lobe level is −2.5 dB. When the ultra-wideband antenna device 10 operates in the 7.78 GHz operation frequency band, and the first antenna 20 and the second antenna 22 are turned on, an antenna radiation pattern of the ultra-wideband antenna device 10 is shown in FIG. 10. It is learnt from a curve shown in the drawing that the main lobe magnitude is 2.27 dBi, the main lobe direction is 154 degrees, the angular width (3 dB) is 64.3 degrees, and the side lobe level is −2.5 dB.

Figure 11:
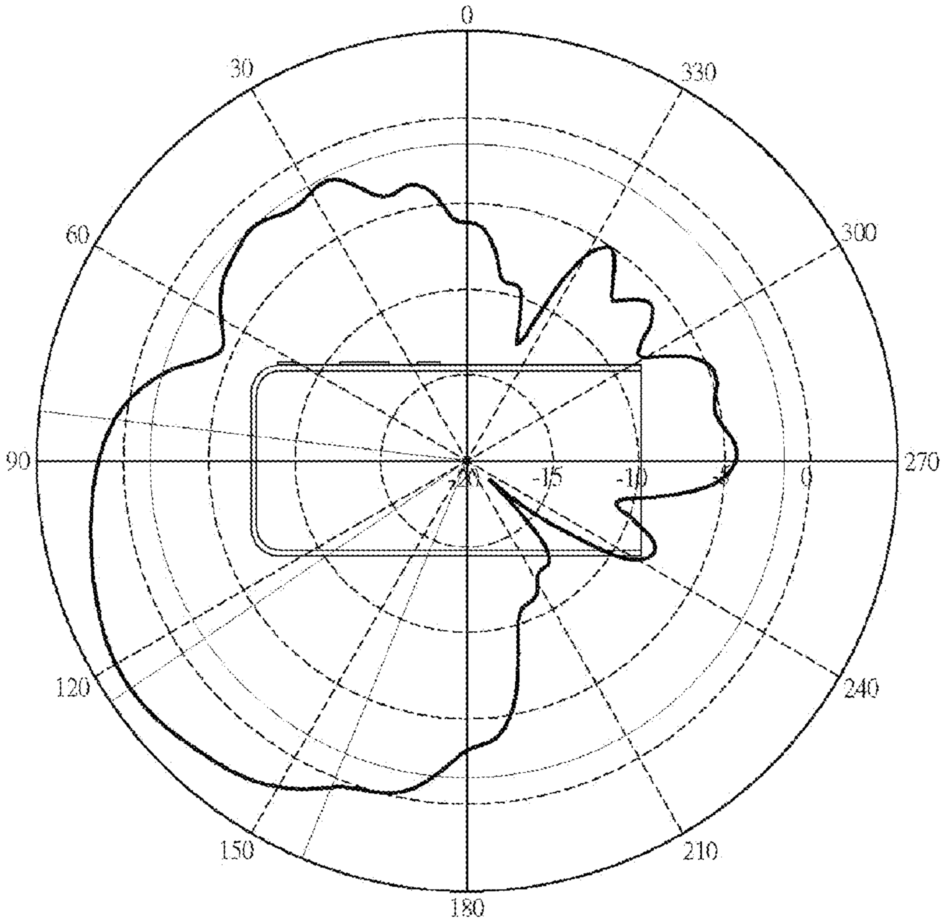
Figure 12:
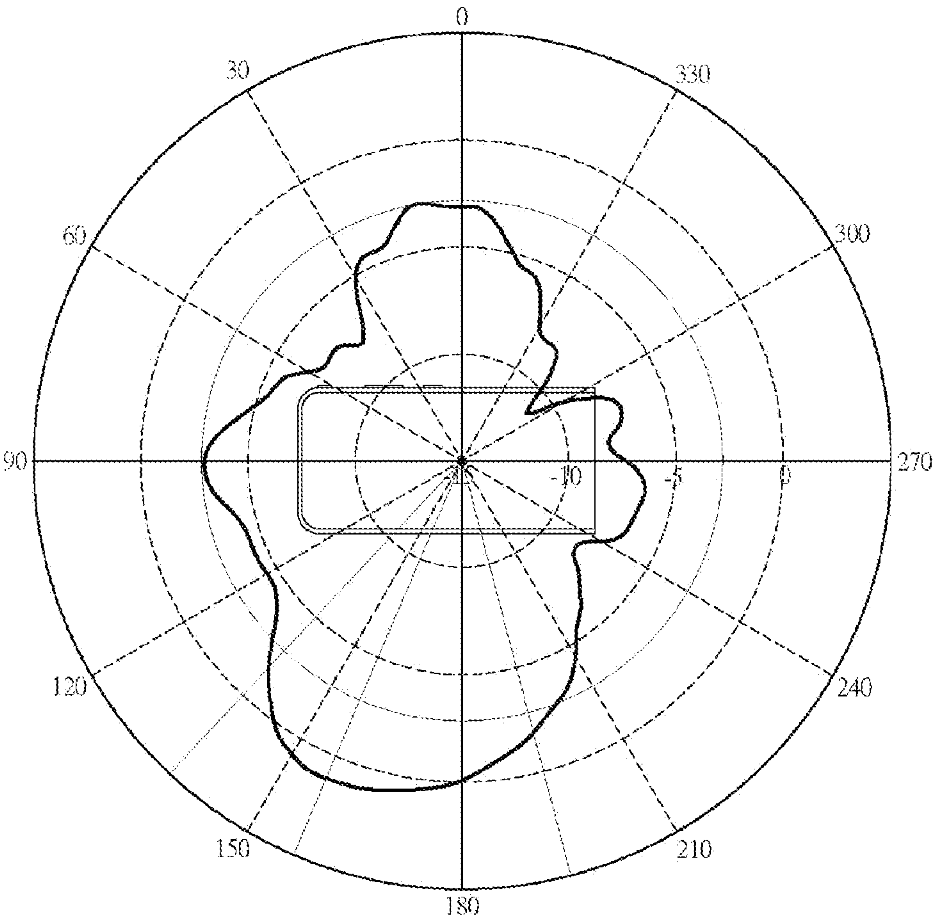

When the ultra-wideband antenna device 10 operates in the 6.325 GHz operation frequency band, and the first antenna 20 and the third antenna 24 are turned on, an antenna radiation pattern of the ultra-wideband antenna device 10 is shown in FIG. 11. It is learnt from a curve shown in the drawing that the main lobe magnitude is 3.54 dBi, the main lobe direction is 124 degrees, the angular width (3 dB) is 73.9 degrees, and the side lobe level is −5.2 dB. When the ultra-wideband antenna device 10 operates in the 7.78 GHz operation frequency band, and the first antenna 20 and the third antenna 24 are turned on, an antenna radiation pattern of the ultra-wideband antenna device 10 is shown in FIG. 12. It is learnt from a curve shown in the drawing that the main lobe magnitude is 1.15 dBi, the main lobe direction is 157 degrees, the angular width (3 dB) is 57.5 degrees, and the side lobe level is −4.0 dB.

Figure 13:
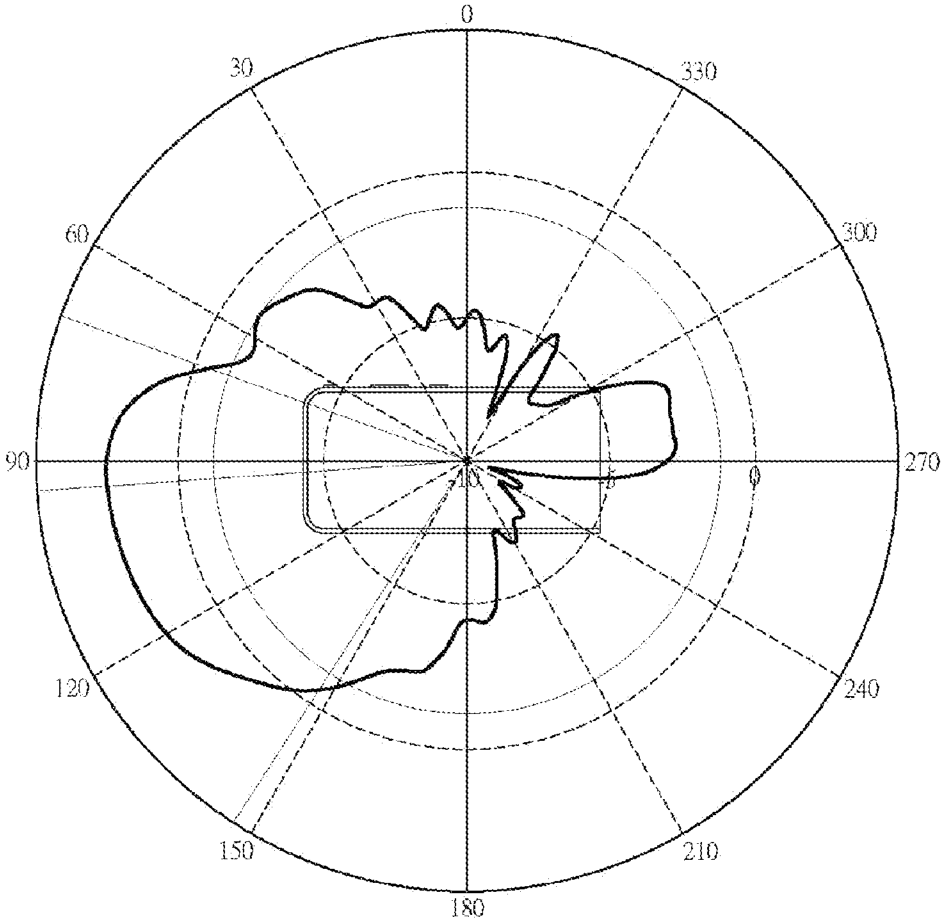
Figure 14:
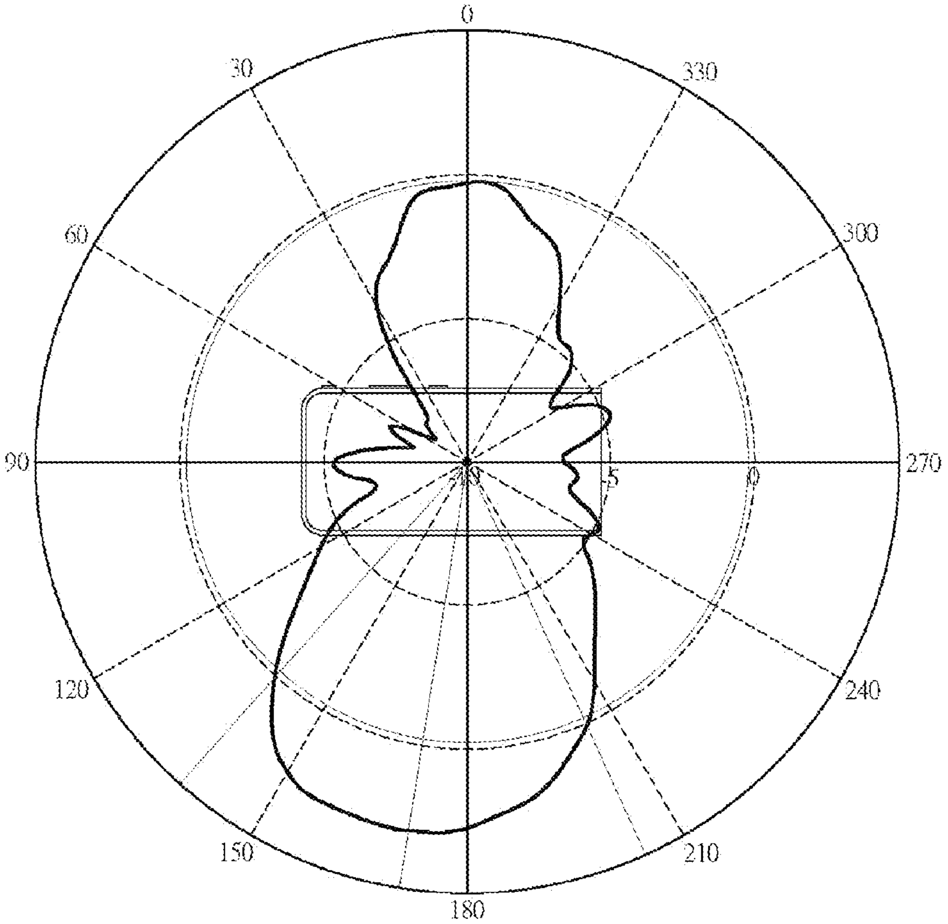

When the ultra-wideband antenna device 10 operates in the 6.325 GHz operation frequency band, and the first antenna 20, the second antenna 22, and the third antenna 24 are turned on, an antenna radiation pattern of the ultra-wideband antenna device 10 is shown in FIG. 13. It is learnt from a curve shown in the drawing that the main lobe magnitude is 2.54 dBi, the main lobe direction is 94 degrees, the angular width (3 dB) is 76.7 degrees, and the side lobe level is −3.8 dB. When the ultra-wideband antenna device 10 operates in the 7.78 GHz operation frequency band, and the first antenna 20, the second antenna 22, and the third antenna 24 are turned on, an antenna radiation pattern of the ultra-wideband antenna device 10 is shown in FIG. 14. It is learnt from a curve shown in the drawing that the main lobe magnitude is 3.06 dBi, the main lobe direction is 171 degrees, the angular width (3 dB) is 65.9 degrees, and the side lobe level is −3.3 dB.

Therefore, the disclosure increases the pattern coverage in distance measurement or positioning through the cooperation of the switch module 18 of the ultra-wideband antenna device 10.

Based on the above, the disclosure provides an ultra-wideband antenna device that selectively switches a distance measurement antenna or a positioning antenna using the switch module without increasing the antenna size and the space, to increase pattern coverage in distance measurement or positioning. Therefore, the ultra-wideband antenna device of the disclosure has good pattern coverage and directivity in a limited space, to effectively increase the antenna efficacy and maintain good wireless communication quality.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. An ultra-wideband antenna device, disposed on a casing of an electronic device, wherein the ultra-wideband antenna device comprises:

- a plurality of radio frequency terminals, located in the casing;
- a first antenna module, located on a metal frame of the casing, wherein the first antenna module comprises a first antenna and a second antenna;
- a second antenna module, located in the casing, wherein the second antenna module comprises a third antenna and a fourth antenna; and
- a switch module, located in the casing and connected between the radio frequency terminals and the first antenna module and between the radio frequency terminals and the second antenna module, wherein when the switch module turns on one of the radio frequency terminals and one of the first antenna or the second antenna for distance measurement, the switch module selectively turns on at least one of the remaining second antenna or first antenna, the third antenna and the fourth antenna for positioning.

2. The ultra-wideband antenna device according to claim 1, wherein four radio frequency terminals are provided, to respectively turn on the radio frequency terminals, the first antenna, the second antenna, the third antenna, and the fourth antenna through the switch module.

3. The ultra-wideband antenna device according to claim 1, wherein the metal frame is further breakable through at least one breakpoint to respectively serve as the first antenna and the second antenna.

4. The ultra-wideband antenna device according to claim 1, wherein when the switch module turns on the first antenna for distance measurement, the switch module selectively turns on one of the second antenna, the third antenna, or the fourth antenna, selectively turns on two of the second antenna, the third antenna, or the fourth antenna, or simultaneously turns on the second antenna, the third antenna, and the fourth antenna.

5. The ultra-wideband antenna device according to claim 1, wherein when the switch module turns on the second antenna for distance measurement, the switch module selectively turns on one of the first antenna, the third antenna, or the fourth antenna, selectively turns on two of the first antenna, the third antenna, or the fourth antenna, or simultaneously turns on the first antenna, the third antenna, and the fourth antenna.

6. The ultra-wideband antenna device according to claim 3, wherein the second antenna module further comprises a fifth antenna, and when the switch module turns on one of the radio frequency terminals and one of the first antenna or the second antenna for distance measurement, the switch module selectively turns on the remaining second antenna or first antenna, and at least one of the third antenna, the fourth antenna, or the fifth antenna.

7. The ultra-wideband antenna device according to claim 6, wherein five radio frequency terminals are provided, to respectively turn on the radio frequency terminals, the first antenna, the second antenna, the third antenna, the fourth antenna, and the fifth antenna through the switch module.

8. The ultra-wideband antenna device according to claim 6, wherein when the switch module turns on the first antenna for distance measurement, the switch module selectively turns on the second antenna for assistance, and the switch module selectively turns on one of the third antenna, the fourth antenna, or the fifth antenna, selectively turns on two of the third antenna, the fourth antenna, or the fifth antenna, or simultaneously turns on the third antenna, the fourth antenna, and the fifth antenna.

9. The ultra-wideband antenna device according to claim 6, wherein when the switch module turns on the second antenna for distance measurement, the switch module selectively turns on the first antenna for assistance, and the switch module selectively turns on one of the third antenna, the fourth antenna, or the fifth antenna, selectively turns on two of the third antenna, the fourth antenna, or the fifth antenna, or simultaneously turns on the third antenna, the fourth antenna, and the fifth antenna.

10. The ultra-wideband antenna device according to claim 6, wherein the third antenna, the fourth antenna, and the fifth antenna are arranged in an L shape.

11. The ultra-wideband antenna device according to claim 1, further comprising a carrier board, wherein the second antenna module is located on the carrier board; and the electronic device further comprises a printed circuit board located in the casing, wherein the carrier board is disposed on the printed circuit board.

* * * * *